United States Patent Office 3,193,534
Patented July 6, 1965

3,193,534
PRODUCTION OF NITROGENOUS POLYVINYL ALCOHOL DERIVATIVES
Kanji Matsubayashi and Masakazu Matsumoto, Kurashiki, Japan, assignors to Kurashiki Rayon Co., Ltd., Kurashiki-shi, Japan, a corporation of Japan
No Drawing. Filed Jan. 26, 1962, Ser. No. 169,082
Claims priority, application Japan, Feb. 2, 1961, 36/3,080
4 Claims. (Cl. 260—77.5)

This invention relates to the preparation of nitrogen-containing polyvinyl alcohol derivatives and the invention is more particularly concerned with the production of nitrogenous polyvinyl alcohol derivatives which are soluble in organic solvents and are useful for the preparation of fibres, films, and other shaped products.

It is known that N-substituted polyvinyl urethane which is insoluble in water and is soluble in organic solvents can be obtained by reacting polyvinyl alcohol with isocyanates. However, isocyanates are costly, are generally poisonous, and their reaction with polyvinyl alcohol is accompanied by many side reactions which lead to low reaction yields. Furthermore, the reaction cannot be carried out uniformly unless organic solvents are used. For these and other reasons, it has been very difficult to carry out this reaction on an industrial scale.

It is accordingly an object of this invention to produce nitrogenous polyvinyl alcohol derivatives, e.g. polyvinyl urethanes, which are soluble in organic solvents, by means which avoid the drawbacks and disadvantages of processes heretofore proposed.

It is a further object of the invention to provide a process for the preparation of polyvinyl urethanes which is economical and efficient and which does not involve the use of isocyanates or like disadvantageous reactants.

In accordance with the present invention, polyvinyl alcohol derivatives, e.g. vinylalcohol-N-phenylvinylurethane copolymer containing N-substituted vinylurethane units, can be readily produced by the reaction of polyvinyl alcohol with an N-substituted urea having at least one hydrogen atom attached to the nitrogen of the urea, this reaction being carried out either with the polyvinyl alcohol in a fused state or in the presence of solvents for polyvinyl alcohol and its reaction products e.g. dimethylformamide. Corresponding results are obtained by directly reacting polyvinyl alcohol simultaneously with urea and an amine having at least one hydrogen atom attached to the nitrogen of the amine, i.e., a primary amine or a secondary amine, e.g. aniline, or by reacting the polyvinyl alcohol with the product obtained by the reaction of urea with an amine having at least one hydrogen atom attached to the nitrogen of the amine. Alternatively, the polyvinyl alcohol can be first reacted with urea and this reaction product then reacted with an amine having at least one hydrogen atom attached to the nitrogen of the amine. In other words, polyvinyl alcohol is reacted with at least one N-substituted urea which may be produced by any known method, but which is most suitably produced by the direct action of urea with an amine, e.g. a primary or secondary amine, the N-substituted urea either being produced prior to reaction with the polyvinyl alcohol or in situ, with the in situ reaction taking place either by simultaneous reaction of the amine, urea, and polyvinyl alcohol, or by stepwise reaction.

By means of any of these methods, it is possible to produce nitrogenous polyvinyl alcohol derivatives having N-substituted vinylurethane units. These derivatives are soluble in various organic solvents, such as dimethylformamide, pyridine, dioxane, aqueous dioxane, and the like. By selecting the extent of reaction and/or the N-substituting group, products of varying water solubility can be produced, ranging from those having some water solubility to those that are essentially water insoluble. In general, higher molecular-weight N-substituting groups and longer reaction times lead to increased water-insolubility.

The product of reaction between polyvinyl alcohol and urea is known but this polyvinyl alcohol-urea reaction product, because of its high water solubility, can be utilized only for the production of water-soluble fibers or films, or it must be subjected to special insolubilizing treatments if it is to be used to form non-water-soluble fibers or films. In contrast, the present invention permits the ready and direct preparation of nitrogenous polyvinyl alcohol derivatives ranging from the water soluble to the water insoluble, for use in the formation of fibers, films, and other shaped products.

The method of the present invention is applicable not only to polyvinyl alcohol itself, e.g. fully-saponified polyvinyl alcohol, but also to other polymers containining vinyl alcohol units, e.g. vinylalcohol copolymers, polyvinylalcohol derivatives, or derivatives of vinyl alcohol copolymers, including partially-saponified polyvinyl acetate having residual acetyl groups, saponified ethylene-vinyl acetate copolymers, and partially-acetalized polyvinyl alcohol.

The polyvinyl alcohol suitable for use in accordance with the present invention is known polyvinyl alcohol and includes polymers composed principally of the vinyl alcohol radical. Polyvinyl alcohol is a polymer containing hydroxyl groups and corresponding to the formula:

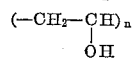

wherein $n$ is an integer which can vary within wide limits, as is well-known in the art. Polyvinyl alcohol can be produced from the corresponding polyvinyl ester, e.g. polyvinyl acetate, by alkaline or acid saponification or re-esterification, i.e. alcoholysis, in accordance with the following equation:

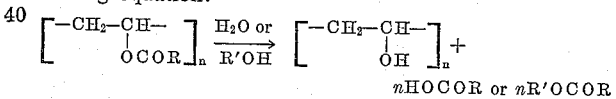

Typical fully-saponified polyvinyl alcohols which can be suitably used are described, for example, in Cline et al. U.S. Patent 2,636,803.

The partially-saponified or partially-esterified polyvinyl alcohol which can be used in accordance with this invention is produced by conventional techniques from polyvinyl esters, such as polyvinyl acetate, by known saponification procedures as described, for example, in Scott et al. U.S. Patent 2,266,996 and Bryant et al. U.S. Patent No. 2,668,809. As is known in the art, a "partially-saponified" polyvinyl alcohol is the product of the hydrolysis of a polyvinyl ester, e.g. polyvinyl acetate, in which less than all of the ester groups, e.g. acetate groups, have been converted to hydroxyl groups. As explained in Scott et al. 2,266,996, the saponification or hydrolysis reaction is stopped by neutralizing the catalyst when the desired percentage conversion has occurred. The partially-saponified polyvinyl alcohols which are suitably used in accordance with this invention are sufficiently saponified that at least about 50% of the ester groups have been converted into hydroxyl groups. The degree of polymerization of the polyvinyl alcohol, may vary widely but is suitably at least about 500. Thus, the polyvinyl alcohol suitably used contains 50 to 100%, preferably 80 to 100%, of vinyl alcohol units.

It will thus be understood that the vinyl alcohol polymers suitable for use in the process of this invention, and which are characterized generically as "polyvinyl alcohol" in the manner employed in Jones U.S. Patent 2,536,980, are known polymeric products and their preparation forms no part of the invention, as will be clear from the foregoing. Thus, to form partially-acetalized polyvinyl alcohol, acetalization is conveniently carried out, in conventional manner, in an aqueous solution containing 0.2–10% aldehyde, 5–20% sulfuric acid and 0–25% sodium sulfate or ammonium sulfate at temperatures of 40–80° C. for times ranging from a few minutes, e.g. 10 minutes, to several hours, e.g. 5 hours.

Mixed polymers of vinyl alcohol are similarly produced in conventional manner by hydrolysis or saponification of a mixed polymer of a vinyl ester and another monomer of the type referred to above. Thus the preparation of completely or partially saponified ethylene-vinyl acetate copolymer is described, for example, in U.S. Patent No. 2,386,347 and in British Patent No. 634,140. Furthermore, it is also within the scope of this invention to subject the products obtained by the method of the invention when applied to fully-saponified polyvinyl alcohol to known chemical reactions such as acetylation, acetalization, and the like.

The invention will be more specifically described by reference to the following example.

To a polyvinyl alcohol having a degree of polymerization of 1600 are added urea and aniline in quantities equivalent to the vinyl alcohol units present and the mixture is reacted at 150° C. for 2 hours. The reaction product is dissolved by heating in dimethylformamide, and precipitated in methanol. The polyvinyl alcohol derivative obtained in this manner contains 4.3% nitrogen, and although it is soluble in dimethylformamide, it is not soluble in water, even when the water is boiled. A film formed from this polyvinyl alcohol derivative exhibits excellent water-resistance. In contrast, the product obtained by reacting polyvinyl alcohol with urea only, with the aniline being omitted from the reaction mixture, contains 4.4% nitrogen but is soluble both in dimethylformamide and in water, and a film formed from this material readily swells in water, and eventually dissolves in it.

The process of this invention can be carried out for varying periods of time, ranging from one minute to several hours, e.g. 1 hour, at temperatures of 120° C. to 250° C., preferably 150° C. to 220° C. The urea derivatives, or urea and amine when used individually, are used in the amount of 1 to 500 mol percent based on the vinyl alcohol units in the polymer being treated. In this manner, it is possible to produce polyvinyl alcohol derivatives containing 0.1 to 10% nitrogen. It is particularly advantageous from a commercial standpoint to react the polymer, e.g. polyvinyl alcohol, and the urea derivative, or urea and amine, in the presence of water, organic solvents for the polymer used, or mixtures of water and organic solvents, in an extruder, so that the reactants in the mixture are reacted and extruded at the elevated temperatures prevailing in the extruder. The extruder which suitably provides the heated reaction extrusion zone for the carrying out of the reaction in accordance with this invention can be any of the various conventional types of extrusion machines commonly used for the extrusion of thermoplastic resins. Typical machines are described, for example, in U.S. Patents Nos. Re. 23,829, 2,893,055 and 2,896,253.

The N-substituted derivative of urea reacted with the vinyl alcohol polymer in accordance with this invention, is suitably any of the mono- and poly N-alkyl-, N-aryl, N-cycloalkyl and N-aralkyl derivatives of urea, such as N-phenylurea, N,N-diphenylurea, N-methylurea, N,N-dimethylurea, N,N,N'-trimethylurea, N-ethylurea, N-butylene, N-cyclohexylurea, N-octylurea, and N-benzylurea, and the like. The amines having at least one hydrogen atom attached to the nitrogen atom which are reacted with the urea either before, during, or after the reaction with the vinyl alcohol polymer are suitably any primary or secondary alkyl, aryl, cycloalkyl or aralkyl amine such as aniline, naphthylamine, methylamine, dimethylamine, ethylamine, butylamine, cyclohexylamine, benzylamine, octylamine, ethanolamine, and the like.

N-substituted ureas are well-known compounds formed by several conventional processes. The formation of N-substituted ureas by the direct action of amines upon urea is described, for example, in U.S. Patents Nos. 1,785,730, 2,249,183, 2,253,528, 2,611,782 and 2,729,677 and in Belgian Patents 450,540 and 450,541.

The invention will be further understood from the following specific examples of practical application. However, it will be understood that these examples are not to be construed as limiting the scope of the present invention in any manner. In the examples, all parts are by weight, unless otherwise indicated.

Example 1

To 44 g. of fully-saponified polyvinyl alcohol having a degree of polymerization of 1600 were added 66 g. of urea and 93 g. of aniline, and the mixture was heated at 150° C. for 2 hours. To the reaction mixture were added 200 g. of dimethylformamide to dissolve it, and the reaction product was then precipitated in methanol. Reprecipitation was effected by again dissolving the product in dimethylformamide and then adding the solution to methanol. The reprecipitated product was extracted with methanol and was found to have a nitrogen content of 4.3%. From a dimethylformamide solution the product was formed into a film 0.1 mm. thick in conventional manner. This film did not deform when soaked in water at room temperature, and did not dissolve in any way even when treated for an hour in boiling water. In contrast, a product produced by following the above-described procedure, but omitting aniline, contained 4.5% nitrogen, but was readily soluble both in dimethylformamide and in water. A film formed from a dimethylformamide solution of this control product swelled extensively when soaked in water at room temperature, and gradually dissolved in it.

Example 2

A mixture of 50 g. of partially-saponified polyvinyl alcohol having 10.1 mol percent acetyl groups and a degree of polymerization of 1400, 70 g. of urea, 100 g. of cyclohexylamine, and 200 g. of dimethylformamide, was heated at 150° C. for 6 hours. The reaction mixture was poured into methanol and the reaction product thus precipitated, and this product was extracted with methanol, and purified. The nitrogen content of the product was 3.8%. From this material there was obtained a water-resistant film comparable to that obtained from the product produced in Example 1.

Example 3

To 44 g. of partially-saponified polyvinyl alcohol having 1.1 mol percent acetyl radicals and a degree of polymerization of 1700, were added 140 g. of N-phenylurea and 100 g. of dimethylformamide and the mixture was heated at 150° C. for 5 hours. Proceeding as in Example 1, there was obtained a nitrogenous polyvinyl alcohol derivative having a 3.8% nitrogen content.

Example 4

A mixture of 400 g. of urea and 100 g. of fully-saponified polyvinyl alcohol of a degree of polymerization of 500 was reacted in the fused state at 160° C. for an hour and the mixture was dissolved in water, and then precipitated in methanol, to provide a polyvinyl alcohol-urea reaction product having a nitrogen content of 4.1%. This reaction product was then subjected to reaction at 150° C. for 4 hours with 50 g. of aniline in the presence of 100 g. of dimethylformamide, and a polyvinyl alcohol derivative containing 3.1% nitrogen was obtained.

Example 5

An ethylene-vinyl alcohol copolymer containing 40.3 mol percent ethylene was reacted with urea and aniline in the manner described in Example 1. A water-resistant polyvinyl alcohol derivative was obtained as in Example 1.

*Example 6*

To 2 kg. of partially-saponified polyvinyl alcohol containing 2.0 mol percent residual acetyl radicals there was added a mixture of 200 g. of urea, 300 g. of aniline and 300 g. of dimethylformamide, and the mixture was thoroughly stirred. The mixture was forced through an extruder while reaction was effected at 180° C. for 10 minutes. The product issuing from the extruder was extracted with methanol and purified. It was a nitrogenous polyvinyl alcohol derivative similar to the product obtained in Example 1.

The conditions and the relative relationships set forth in the examples are those preferred in carrying out the process of this invention, but it will be understood that other conditions and relationships may be used within the scope of the invention. As mentioned above, in general, unless otherwise indicated, conventional operations and techniques are used and conventional apparatus is suitably employed, e.g. conventional mixing apparatus and conventional reactors are advantageously employed. Pressure does not appear to be a parameter of the process which may be carried out at atmospheric pressure or at superatmospheric pressure, any superatmospheric pressure being that normally developed in the apparatus in which heating is effected.

If desired, the nitrogen-containing polyvinyl alcohol product may be processed into shaped forms in accordance with conventional techniques used in the polyvinyl alcohol art. Thus, to form fibers, the compositions are spun in conventional manner, e.g. by extruding a suitable solution through small holes in a spinning jet into a medium effective to remove water therefrom. In wet spinning processes the medium can, for example, be a concentrated aqueous solution of a coagulating salt such as sodium sulfate or ammonium sulfate, while in dry spinning techniques air or an inert gas such as nitrogen is employed. Suitable spinning conditions for producing fibers from the spinning solutions of this invention are described, for example, in U.S. Patent 2,642,333 as well as in Cline et al. U.S. Patent 2,636,803 and Osugi et al. U.S. Patent 2,906,594.

The products are similarly formed into other shapes, such as films, by conventional techniques. Thus, films are suitably produced by the procedure described, for example, in Izard et al. U.S. 2,236,061 and in Herrmann et al. U.S. Patent 2,837,770.

It will also be understood that various changes and modifications in addition to those indicated above may be made in the embodiments therein described without departing from the scope of the invention as defined in the appended claims. It is intended, therefore, that all matter contained in the foregoing description shall be interpreted as illustrative only and not as limitative of the invention.

We claim:

1. A method of producing a nitrogenous polyvinyl alcohol derivative containing N-substituted vinyl urethane units and where said derivative is insoluble in boiling water which comprises, preparing a mixture consisting of urea, an amine, and a vinyl alcohol polymer, said urea and said amine being present in said mixture in sufficient quantities to form an N-substituted derivative of urea, said vinyl alcohol polymer containing at least 50% vinyl alcohol units, said amine being a monoamine selected from the group consisting of aniline, naphthylamine, methylamine, dimethylamine, ethylamine, butylamine, cyclohexylamine, benzylamine, octylamine, and ethanolamine;

and reacting said urea and said amine and said vinyl alcohol polymer in said mixture at a temperature within the range of 120° C. to 250° C. to produce a nitrogenous polyvinyl alcohol derivative containing N-substituted vinyl urethane units and where said derivative is insoluble in boiling water.

2. A method according to claim 1, wherein said urea and said amine and said vinyl alcohol polymer in said mixture are reacted at a temperature within the range of 150° C. to 220° C.

3. A method according to claim 1, wherein said amine is aniline.

4. A method according to claim 3, where said produced nitrogeneous polyvinyl alcohol derivative contains about 4.3% nitrogen.

References Cited by the Examiner

UNITED STATES PATENTS

| 2,145,242 | 1/39 | Arnold | 260—77.5 |
|---|---|---|---|
| 2,339,768 | 1/44 | D'Alelio | 260—91.3 |
| 2,447,140 | 8/48 | Shelton | 260—91.3 |

FOREIGN PATENTS

| 519,049 | 2/51 | Germany. |
|---|---|---|
| 1,093,088 | 11/60 | Germany. |

LEON J. BERCOVITZ, *Primary Examiner.*